United States Patent
Bandi et al.

(10) Patent No.: US 10,995,188 B2
(45) Date of Patent: May 4, 2021

(54) STABILIZER FOR POLYAMIDES

(71) Applicant: Evonik Operations GmbH, Essen (DE)

(72) Inventors: Suneel Bandi, West Lafayette, IN (US); Andreas Pawlik, Recklinghausen (DE)

(73) Assignee: Evonik Operations GmbH, Essen (DE)

(*) Notice: Subject to any disclaimer, the term of this patent is extended or adjusted under 35 U.S.C. 154(b) by 640 days.

(21) Appl. No.: 15/794,811

(22) Filed: Oct. 26, 2017

(65) Prior Publication Data

US 2019/0127536 A1 May 2, 2019

(51) Int. Cl.
*C08J 5/04* (2006.01)
*C08G 69/26* (2006.01)
*C08L 77/06* (2006.01)

(52) U.S. Cl.
CPC ............ *C08J 5/043* (2013.01); *C08G 69/265* (2013.01); *C08L 77/06* (2013.01); *C08J 2377/06* (2013.01); *C08J 2465/00* (2013.01)

(58) Field of Classification Search
CPC .... C08J 5/043; C08J 2377/06; C08J 2465/00; C08G 69/265; C08L 77/06
USPC ........................................................ 524/514
See application file for complete search history.

(56) References Cited

U.S. PATENT DOCUMENTS

| | | | |
|---|---|---|---|
| 3,607,853 A | 9/1971 | Oberkirch et al. | |
| 3,974,092 A | 8/1976 | Streck et al. | |
| 3,974,094 A | 8/1976 | Streck et al. | |
| 4,334,048 A | 6/1982 | Katz et al. | |
| 4,346,194 A | 8/1982 | Roura | |
| 5,162,483 A | 11/1992 | Poll et al. | |
| 5,258,213 A * | 11/1993 | Mugge ............ | B32B 27/08 428/36.91 |
| 6,207,737 B1 | 3/2001 | Schell et al. | |
| 6,579,581 B2 | 6/2003 | Bartz et al. | |
| 6,846,855 B2 | 1/2005 | Campbell et al. | |
| 7,419,721 B2 | 9/2008 | Beerda et al. | |
| 7,671,127 B2 | 3/2010 | Weber et al. | |
| 7,732,047 B2 | 6/2010 | Kashikar et al. | |
| 7,763,674 B2 | 7/2010 | Gijsman et al. | |
| 2013/0228728 A1 | 9/2013 | Mathur et al. | |
| 2015/0306854 A1 | 10/2015 | Frueh et al. | |

FOREIGN PATENT DOCUMENTS

EP 0084643 8/1983

OTHER PUBLICATIONS

A. Dräxler, "Trans-Polyoctenamer" Kautschuk + Gummi, Kunststoff, 1981, pp. 185-190.

* cited by examiner

*Primary Examiner* — Ling Siu Choi
*Assistant Examiner* — Ronald Grinsted
(74) *Attorney, Agent, or Firm* — Oblon, McClelland, Maier & Neustadt, L.L.P.

(57) ABSTRACT

The present invention relates to a thermoplastic composition that provides improved thermal aging stability. The thermoplastic composition includes a polyamide resin, glass fibers, tin(II) oxalate, and a functional additive. It has been found that a combination of a polyamide resin with tin(II) oxalate and a functional additive produces a superior product demonstrating greater thermal stability than the polyamide resin alone.

8 Claims, No Drawings

STABILIZER FOR POLYAMIDES

FIELD OF THE INVENTION

The present invention relates to poly ides having excellent thermal aging resistance and durability.

BACKGROUND OF THE INVENTION

Nylon polymer commonly takes the form of pellets or flakes, which can be melted and shaped for use in plastic applications or extruded as fiber for use in yarn applications, such as apparel, carpet, airbags and outdoor gear. Nylon polymers are desirable in many applications due to its outstanding elasticity, dye-fastness and high melting point.

Nylon resins are often formulated with additives which impart desired properties to the resin in order to make it suitable for other uses. Desired properties include thermal aging resistance and impact resistance. Typically polymer compositions often comprise fillers to modify the mechanical properties of a resin.

The thermal stability of nylon polymers used for various purposes is a very critical characteristic. When plastic parts such as those used in automobiles and electrical or electronic equipment are exposed to high temperatures for a long period of time, their mechanical properties will decrease due to thermal degradation of the polymers. This kind of phenomena is known as heat aging. In order to prevent such a decrease of mechanical properties, various heat stabilizers are usually added to polymers to improve their heat aging properties. For instance, polyamides are usually stabilized with heat stabilizers including phenolic antioxidant, aromatic amines and copper or copper salt in combination with potassium iodide or potassium bromide.

For example, in U.S. Pat. No. 7,763,674 non-metallic inorganic filler and elementary iron was used in the thermoplastic composition to achieve heat aging properties. U.S. Pat. Pub. No. 2013/0228728 discloses a thermoplastic composition that comprises a polyamide resin and a polyhydric alcohol that provides improved thermal aging stability. However, none of these compositions can meet all the application requirements at temperatures of 230° C. for 1000 hours or more.

With the rapid development of the automobile and electronic industries a better thermal stability of polymer materials are needed. Therefore, there is a need for compositions with increased aging stability with regard to standard stabilizing systems.

SUMMARY OF THE INVENTION

The present invention relates to a thermoplastic composition that provides improved thermal aging stability. The thermoplastic composition comprises a polyarnide resin, reinforcing fibers, tin(II) oxalate and a functional additive. It has been found that a combination of a polyamide resin with tin(II) oxalate and functional additive produces a superior product demonstrating greater thermal stability than the polyamide resin alone.

DETAILED DESCRIPTION OF THE INVENTION

The present invention relates to a thermoplastic composition that provides improved thermal aging stability. The thermoplastic composition comprises a polyamide resin, reinforcing fibers, tin(II) oxalate and a functional additive. It has been found that a combination of a polyamide resin with tin(II) oxalate and a functional additive produces a superior product demonstrating greater thermal stability than the polyamide resin alone.

Suitable polyamide resins that may be used for the current invention include any known polyamides in the art. These include aliphatic, semicrystalline, amorphous, aromatic or semiaromatic nylon resins. The nylon resins are those prepared from starting materials of essentially a lactam or a diamine, and an aliphatic, serniarornatic or aromatic dicarboxylic acid. Suitable lactams include caprolactam and laurolactam. Suitable amines include tetramethylenediamine, hexamethylenediamine (HMD), 2-methylpentamethylenediamine, undecamethylenediamine, dodecamethylenediamine, 2,2,4-12,4,4-trimethylhexamethylenediarnine, 5-methylnonamethylenediarnine, metaxylylenediamine (MXD) and paraxylylenediamine. Suitable dicarboxylic acids such include adipic acid, suberic acid, azelaic acid, sebacic acid, dodecanedioic acid (DDDA), terephthalic acid (TPA), isophthalic acid (IPA), 2-chloroterephthalic acid, 2-methylterephthalic acid, 5-methylisophthalic acid, 5-sodium-sulfoisophthalic acid, hexahydroterephthalic acid and hexahydroisophthalic acid. In the invention, nylon homopolymers or copolymers to be derived from those starting materials are used either singly or as their mixtures.

Specific examples of polyamide resins that are suitable for the current invention are polycapramide (nylon 6), polyundecanamide (nylon 11), polylauramide (nylon 12), polyhexarnethylenadipamide (nylon 66), polytetramethylenadipamide (nylon 46), polyhexamethylenesebacamide (nylon 610), polyhexamethylenedodecamide (nylon 612), polyhexamethyleneterephthalamide/polycapramide copolyrner (nylon 6T16), polyhexamethyleneterephthalamide/polydodecanamide copolymer (nylon 6T/12), polyhexarnethylenadipamide/polyhexamethyleneterephthalarnide copolymer (nylon 66/6T), polyhexamethylenadipamide/polyhexamethylenisophthalamide copolymer (nylon 66/6I), polyhexamethylenadipamide/polyhexamethylenisophthalamide/-polycapramide copolymer (nylon 66/6I/6), polyhexamethylenadipamide/polyhexamethyleneterephthalamide/polyhexamethylenisophthalarnide copolymer (nylon 66/6T/6I), polyhexamethyleneterephthalamide/-polyhexamethylenisophthalamide copolymer (nylon 6T/6I), polyhexamethyleneterephthalamide/poly(2-methylpentarnethylene)terephthalamide copolymer (nylon 6T/M5T), polyhexamethyleneterephthalamide/-polyhexarnethylenesebacarnideipolycapramide copolymer (nylon 6T/610/6), polyhexarnethyleneterephthalamide/polydodecanamidel-polyhexamethylenadiparnide copolymer (nylon 6T/12/66), polyhexamethyleneterephthalamide/polydodecanamidei-polyhexamethylenisophthalarnide copolymer (nylon 6T/12/6I), poly m-xylylenadiparnide (nylon MXD6), semicrystalline polyphthalamide (VESTAMID® Htplus M1000 commercially available from Evonik Industries AG) as well as theft mixtures and copolymers, etc.

Nylon resins suitable for the current invention are Nylon 6, Nylon 6,6, Nylon 6,12, Nylon 4,6, Nylon 6,10, Nylon 7, Nylon 10, Nylon 10, 10, Nylon 12, Nylon 12, 12, Nylon 6T, Nylon 9T, Nylon 10T, Nylon 6T/6I, Nylon 6T/DT, Nylon MXD-6 and combinations or copolymers thereof. In another exemplary embodiment of the current invention the polyamide resin is Nylon 6,6. In another exemplary embodiment of the current invention the polyamide resin is semicrystalline polyphthalamide (VESTAMID® Htplus M1000).

Suitable reinforcing fibers that may be used for the current invention include any known reinforcing fibers in the art.

The reinforcing agent that can be used in the process according to the invention, and in the composition obtainable by said process, may be any type of non-metallic fibrous reinforcing agent suitable for use in fiber reinforced thermoplastic compositions for use in high temperature applications. A fibrous reinforcing agent is considered herein to be a material having length, width and thickness, wherein the average length is significantly larger than both the width and thickness. Generally, such a material has an aspect ratio UD, defined as the average ratio between the length (L) and the largest of the width and thickness (D) of at least 5. Preferably, the aspect ratio of the fibrous reinforcing agent is at least 10, more preferably at least 20, still more preferably at least 50.

Suitable non-metallic fibrous reinforcing agents that can be used in the process according to the invention, and in the composition obtainable with said process, are, for example, glass fibers, carbon or graphite fibers, aramide fibers, cellulosic fibers, ceramic fibers, mineral fibers, such as wollastonite, and whiskers. Preferably, glass fibers are chosen.

The thermoplastic compositions of the current invention may also comprise a functional additive. A functional additive, is defined with characteristics of flow aid, lubricant, impact modifier, reactive component, or all the properties together. U.S. Pat. Nos. 4,346,194, 6,579,581 and 7,671,127, herein incorporated by reference, teach nylon resins with impact modifying components.

Other suitable functional additive include a maleic anhydride functionalized elastomeric ethylene copolymer, a maleic anhydride functionalized elastomeric ethyleneipropylene copolymer, a terpolymer of ethylene, acrylic ester and maleic anhydride, a maleic anhydride grafted (MAH) polyolefin elastomer or combinations thereof.

Another suitable functional additive is polyalkenylene under the trade name VESTENAMER® 8012. The polyalkenylene is composed of repeat units of the following formula:

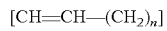

[CH=CH—(CH$_2$)$_n$]

where n=from 3 to 10. It is mostly produced via ring-opening polymerization of cycloolefins in the presence of a metathesis catalyst. The degree of polymerization is generally from 6 to 2000, preferably from 15 to 1500 and particularly preferably from 25 to 1200. Examples of suitable polymers are polypentenylene, polyhexenylene, polyheptenylene, polyoctenylene, polynonenylene, polydecenylene, poly(3-methyloctenylene), poly(3-methyldecenylene), polyundecenylene or polydodecenylene. Polyalkenylenes are sometimes also termed polyalkenamers, and the polymers belonging to this group are sometimes also called polypentenarner, polyhexenarner, polyheptenamer, polyoctenamer etc.

The production of polypentenylene is described by way of example in U.S. Pat. No. 3,607,853. Polyhexenylene is produced by alternating copolymerization of butadiene and ethene. Polyheptenylene is produced by metathesis of cycloheptene (e.g. U.S. Pat. No. 4,334,048) and polyoctenylene is produced by metathesis of cycloctene (A. Dräxler, Kautschuk+Gummi, Kunststoff 1981, pages 185 to 190). The higher polyalkenylenes are produced correspondingly. For the purposes of the invention, mixed polyalkenylenes, i.e. copolymers (U.S. Pat. Nos. 3,974,092; 3,974,094) or a mixture of various polyalkenylenes can also be used.

The polyamide resin content of the disclosed compositions may range from about 30% to about 99.9%, about 35% to about 95%, about 40% to about 90%, about 45% to about 85%, about 50% to about 80%, about 55% to about 75%, about 60% to about 70% based on total weight of the composition.

The reinforcing fiber content of the disclosed compositions may range from about 0% to about 70%, about 5% to about 65%, about 10% to about 60%, about 15% to about 55%, about 20% to about 50%, about 25% to about 45%, about 30% to about 40% based on total weight of the composition.

The tin(II) oxalate, content of the disclosed compositions may range from about 0.01% to about 10%, about 0.05% to about 9%, about 0.08% to about 8%, about 0.1% to about 7%, about 0.15% to about 6%, about 0.2% to about 5%, about 0.3% to about 6%, about 0.4% to about 5%, about 0.5% to about 4%, about 0.6% to about 4% based on total weight of the composition.

The functional additive content of the disclosed compositions may range from about 0.1% to about 20%, about 0.5% to about 18%, about 1% to about 15%, about 3% to about 13%, about 5% to about 10%, based on total weight of the composition.

The thermoplastic compositions of the current invention may further comprise additives such as lubricants, glass fillers, mineral fillers, plasticizers, pigments, dyes, antioxidants, heat stabilizers, hydrolysis stabilizers, nucleating agents, flame retardants, synergists, drip suppressants, blowing agents, foaming agent and combinations thereof. Suitable mineral fillers can be selected from the group consisting of kaolin, clay, talc, and wollastonite, diatomite, titanium dioxide, mica, amorphous silica and combinations thereof. The lubricant may be a metal stearate, ethylene bis-stearamide or any other suitable lubricant. Suitable glass fillers are selected from the group consisting of glass fiber, glass flakes, glass beads and combinations thereof. The glass fibers may also be coated with a sizing composition and organosilane coupling agents to provide hydrolysis resistance. Suitable coated glass fibers are taught in U.S. Pat. Nos. 6,207,737, 6,846,855, 7,419,721 and 7,732,047, which are herein incorporated by reference. Suitable heat stabilizers are selected from the group consisting of hindered phenols, amine antioxidants, hindered amine light stabilizers (HALS), aryl amines, phosphorus based antioxidants, copper heat stabilizers, polyhydric alcohols, tripentaerythritol, dipentaerythritol, pentaerythritol and combinations thereof.

The process according to the invention can be carried out by any known melt-mixing process that is suitable for preparing fiber-reinforced thermoplastic molding compositions. Such a process is typically carried out by heating the thermoplastic polymer above the melting temperature or in case the thermoplastic polymer is an amorphous polymer above the glass transition temperature, of the thermoplastic polymer thereby forming a melt of the thermoplastic polymer.

The process according to the invention can be carried out in a melt-mixing apparatus, for which any melt-mixing apparatus known to one skilled in the art of preparing polymer compositions by melt mixing can be used. Suitable melt-mixing apparatus are, for example, kneaders, Banbury mixers, single-screw extruders and twin-screw extruders. Preferably, use is made of an extruder fitted with means for dosing all the desired components to the extruder, either to the extruder's throat or to the melt.

In the process according to the invention the constituting components for forming the composition are fed to the melt-mixing apparatus and melt-mixed in that apparatus. The constituting components may be fed simultaneously as a powder mixture or granule mixture, also known as dry-blend, or may be fed separately.

The process according to the invention is not limited in the way the tin(II) oxalate is added. It may be added, for example, as a powder, a dry-blend or premix comprising the thermoplastic polymer in granulate form and the tin(II) oxalate in powder form, or as a masterbatch of finely dispersed elementary particles in a carrier polymer.

Advantageously, the tin(II) oxalate and polyalkenylene (VESTENAMER® 8012) is added in the form of a masterbatch, since this allows a better control of the dosing accuracy of the polyalkenylene (VESTENAMER® 8012) and tin(II) oxalate when the polyalkenylene (VESTENAMER® 8012) and tin(II) oxalate is added in small quantities relative to the thermoplastic polymer. Another advantage of the use of a masterbatch is that it is easier to obtain a homogenous blend of the polyalkenylene (VESTENAMER® 8012) and tin(II) oxalate with the thermoplastic polymer.

The masterbatch may further comprise a binder, lubricant, colorant, fillers, flame retardant component, or other additives.

Another embodiment of the current invention comprises a process for molding a shaped article formed from a polyamide resin and the masterbatch composition described above. The process comprises the steps of intimately admixing or combining a granular polyamide resin with the masterbatch composition to form a compounded thermoplastic composition, wherein the masterbatch composition comprises from about 0.05% to about 20% by weight of the compounded thermoplastic composition and then molding the compounded thermoplastic composition into a shaped article. The compounded thermoplastic composition produced by the process may be used to make shaped articles via injection molding, extrusion, or cast setting.

Thermoplastic compositions of the current invention have been found to meet desired heat aging standards. After 1000 hours of hot air testing at 230° C., the compounded polyamide composition is capable of retaining greater than 60% of its tensile strength.

EXAMPLES

The following Examples demonstrate the present invention and its capability for use. The invention is capable of other and different embodiments, and its several details are capable of modifications in various apparent respects, without departing from the scope and spirit of the present invention. Accordingly, the Examples are to be regarded as illustrative in nature and non-limiting.

The following examples were performed using semicrystalline polyphthalamide (PPA) resin commercially available from EVONIK INDUSTRIES AG under the trade name VESTAMID® Htplus M1000 Commercially available glass fibers were used, such as CHOPVANTAGE HP 3610 chopped glass fiber available from PPG Fiber Glass. A masterbatch of 80% polyalkenylene (VESTENAMER® 8012) and 20% tin(II) oxalate was used. Tin(II) oxalate was commercially available from SIGMA-ALDRICH. Polyalkenylene under the trade name VESTENAMER® 8012 was commercially available from EVONIKINDUSTRES AG.

Formulations were prepared by melt blending semicrystalline polyphthalamide (VESTAMID® Htplus M1000) and the masterbatch of polyalkenylene (VESTENAMER® 8012) and tin(II) oxalate in a 27 mm twin screw extruder. The extruder was maintained at about 320° C. with a screw speed of about 300 rpm, and a throughput of 20 kg/hour. The glass fibers were added to the melt through a screw side feeder and the compounded mixture was extruded in the form of strands, cooled in a water bath, chopped into pellets, dried at 120° C. for 16 hours. The pellets were tested for moisture content level of 0.1% and then injection molded as standard ISO tensile bars.

The tensile strength and elongation at break were measured according to ISO 527. The tests were performed using injection molded ISO tensile bars. The hot air aging tests were performed by according to the ISO 2578 testing method. Samples were heat aged in re-circulating air ovens to simulate aging conditions. At specific intervals of heat aging, the samples were removed from the oven and allowed to cool in a temperature and humidity controlled room. Finally, the aged samples and corresponding controls were conditioned for 16 hours before tested for mechanical and thermal properties.

TABLE 1

| | C1 | Ex1 | C2 | Ex2 | Ex3 | Ex4 | C3 | Ex5 | Ex6 |
|---|---|---|---|---|---|---|---|---|---|
| VESTAMID HT plus M1000 | 100 | 94 | 70 | 65 | 60 | 55 | 50 | 45 | 40 |
| Glass Fibers HP 3610 | | | 30 | 30 | 30 | 30 | 50 | 50 | 50 |
| VESTENAMER 8012 * | | 4.8 | | 4 | 8 | 12 | | 4 | 8 |
| Tin(II) Oxalate * | | 1.2 | | 1 | 2 | 3 | | 1 | 2 |
| Aging at 230° C. | | | | Stress at break (MPa) | | | | | |
| 0 hr | 103 | 81 | 216 | 189 | 170 | 155 | 288 | 234 | 195 |
| 500 hr | 4 | 22 | 39 | 134 | 145 | 140 | 32 | 172 | 155 |
| 1000 hr | 0 | 12 | 29 | 88 | 97 | 99 | 4 | 120 | 97 |
| Aging at 230° C. | | | | Stress at break (normalized, %) | | | | | |
| 0 hr | 100 | 100 | 100 | 100 | 100 | 100 | 100 | 100 | 100 |
| 500 hr | 4 | 27 | 18 | 71 | 85 | 91 | 11 | 74 | 79 |
| 1000 hr | 0 | 15 | 13 | 46 | 57 | 64 | 1 | 51 | 50 |

* a masterbatch of 80% VESTENAMER 8012 and 20% Tin(II) Oxalate has been used
*C = Comparison Example
Ex = Example Invention Table 1 shows the results of resins with varying amounts of the master batch of polyalkenylene (VESTENAMER® 8012) and tin(II) oxalate. The samples where tested for heat aging at 230° C. for 0 hr, 500 hrs, and 1000 hrs. Comparison of C1 with Ext (without glass fibers) shows the positive influence of VESTENAMER® 8012/tin(II) oxalate with respect to heat aging. Comparison of C2 with Ex2 to Ex4 (with 30% of glass fibers) shows the positive influence of VESTENAMER® 8012/tin(II) oxalate with respect to heat aging. Comparison of C3 with Ex5 and Ex6 with (50% of glass fibers) shows the positive influence of VESTENAMER® 8012/tin(II) oxalate with respect to heat aging. For better comparison the normalized values for stress at break are also given. VESTENAMER® 8012, also acts like an impact modifier. As the content of VESTENAMER® 8012 increases the stress at break decreases.

What is claimed is:

1. A thermoplastic composition, comprising, based on a total weight of the composition;
   a) 30 to 90 wt % of a polyamide resin;
   b) 5 to 65 wt % of reinforcing fibers;
   c) 2 to 10 wt % of tin(II) oxalate; and
   d) 0.1 to 20 wt % of a functional additive,
   wherein the functional additive is polyalkenylene, and
   wherein the contents sum up to 100 wt %.

2. The thermoplastic composition of claim 1, comprising, based on the total weight of the composition:
   a) 40 to 70 wt % of the polyamide resin;
   b) 20 to 50 wt % of reinforcing fibers;
   c) 2 to 5 wt % of tin(II) oxalate; and
   d) 1 to 15 wt % of the functional additive which is polyalkenylene,
   wherein the contents sum up to 100 wt %.

3. The thermoplastic composition of claim 1, wherein the polyamide resin is at least one selected from the group consisting of Nylon 6, Nylon 6,6, Nylon 6,12, Nylon 4,6, Nylon 6,10, Nylon 7, Nylon 10, Nylon 10, 10, Nylon 12, Nylon 12, 12, Nylon 9T, Nylon 10 T, Nylon 6T, Nylon 6T/6I, Nylon 6T/DT, and Nylon MXD-6.

4. The thermoplastic composition of claim 1, wherein the polyamide resin is semicrystalline polyphthalamide.

5. The thermoplastic composition of claim 1, wherein the reinforcing fibers is glass fibers.

6. The thermoplastic composition of claim 1, wherein the functional additive is polyalkenylene comprising repeat units of the following formula:

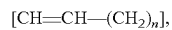

wherein n=from 3 to 10.

7. The thermoplastic composition of claim 1, further comprising at least one additive selected from the group consisting of lubricants, glass fillers, mineral fillers, impact modifiers, plasticizers, pigments, dyes, antioxidants, heat stabilizers, hydrolysis stabilizers, nucleating agents, flame retardants, synergists, drip suppressants, and blowing agents.

8. The thermoplastic composition of claim 1, wherein, after 1000 hours of hot air testing at 230° C., the thermoplastic composition is capable of retaining greater than 60% of its tensile strength compared to a tensile strength before the hot air testing.

* * * * *